United States Patent
Terada

(10) Patent No.: US 7,105,747 B2
(45) Date of Patent: Sep. 12, 2006

(54) HARNESS EXCESS-LENGTH ABSORBING APPARATUS

(75) Inventor: Tomoyasu Terada, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/950,488

(22) Filed: Sep. 28, 2004

(65) Prior Publication Data

US 2005/0133253 A1 Jun. 23, 2005

(30) Foreign Application Priority Data

Dec. 11, 2003 (JP) ............................ P2003-413287

(51) Int. Cl.
*H02G 1/00* (2006.01)
(52) U.S. Cl. .................... 174/72 A; 174/154; 174/135
(58) Field of Classification Search .............. 174/72 A, 174/135, 154
See application file for complete search history.

(56) References Cited

U.S. PATENT DOCUMENTS 5,877,936 A * 3/1999 Nishitani et al. ........... 361/600

FOREIGN PATENT DOCUMENTS

JP 9-20189 A 1/1997

* cited by examiner

*Primary Examiner*—Jinhee Lee
(74) *Attorney, Agent, or Firm*—Sughrue Mion, PLLC

(57) ABSTRACT

A harness excess-length absorbing apparatus (1) includes a protector (4) for receiving a wire harness (14) in a folded-back condition, a harness guide member (7) which is provided in a folded-back portion (14a) of the wire harness, and can be moved in a longitudinal direction of the wire harness, and urging members (5) urging the harness guide member in a direction to draw the wire harness into the protector. Flanges (26) are formed on and project substantially perpendicularly from opposite ends of a harness guide surface (25) of the harness guide member (7), respectively, and a claw (27) for holding the wire harness is formed at each of the flanges. The claws (27) are offset from an apex of the harness guide surface (25) toward one side of the harness guide surface. The pair of claws (27) are provided at each of the opposite sides of the harness guide surface (25) generally in a diametrical direction. Alternatively, the pair of claws (27) are provided at one side of the harness guide surface (25) generally in the diametrical direction, while slanting ribs (28), formed respectively by notching the flanges (26) in a slanting manner, are provided at the other side of the harness guide surface generally in the diametrical direction.

7 Claims, 5 Drawing Sheets

HARNESS EXCESS-LENGTH ABSORBING APPARATUS

BACKGROUND OF THE INVENTION

1. Field of the Invention

This invention relates to a harness excess-length absorbing apparatus provided with a harness guide member which urges a wire harness in a draw-in direction while folding back the wire harness within a protector.

2. Related Art

FIG. 7 shows one conventional harness excess-length absorbing apparatus as shown in Unexamined Japanese Patent Publication Hei 9-20189.

This harness excess-length absorbing apparatus 41 comprises a synthetic resin-made casing 42, a fixing guide 43 of a cylindrical shape provided within the casing 42 at one end portion thereof, a moving guide 44 of a cylindrical shape slidably mounted within the casing at the other end portion thereof, and a coil spring 45 urging the moving guide 44 in a direction away from the fixing guide 43.

Within the casing 42, a flat wire harness 46 extends around the moving guide 44 and fixed guide 43 to be bent into a generally S-shape, and one end of the wire harness 46 is connected to one connector 47, while the other end of the wire harness 46 is led to the exterior through a harness outlet port 48 in the casing 42.

A power-side wire harness 49 is connected to the connector 47, and the other end of the wire harness 46 is connected to an electrical equipment or an accessory mounted, for example, on an opening/closing structure such as a door. In accordance with an opening operation of the opening-closing structure, the wire harness 46 is drawn out of the casing 42 while compressing the coil spring 45. During a closing operation of the opening/closing structure, the wire harness 46 tends to become loose or slack, but the coil spring 45 urges the moving guide 44 to move in a direction of expanding of the coil spring, so that the wire harness 46 is drawn into the casing 42, thereby absorbing the slack (excess length) of the wire harness.

In the above conventional harness excess-length absorbing apparatus 41, however, the wire harness 46 was liable to be disengaged from the moving guide (guide member) 44 in a direction of a length thereof during the drawing-out and drawing-in operations of the wire harness 46, and in such a case there was a fear that a side edge portion of the wire harness 46 was brought into rubbing contact with the casing 42 and an end edge of the moving guide 44, and was worn or damaged. And besides, when the wire harness 46 was to be mounted or set within the casing, there was a fear that the wire harness 46 was disengaged from the moving guide 44 in the longitudinal direction thereof, or was lifted radially outwardly from the guide, so that this mounting operation could not be carried out easily.

SUMMARY OF THE INVENTION

In view of the foregoing, it is an object of this invention to provide a harness excess-length absorbing apparatus in which a wire harness is prevented from being disengaged from a guide member during the drawing-out and drawing-in of a wire harness, thereby preventing wear, damage, etc., of the wire harness, and besides during the mounting of the wire harness, the wire harness is prevented from being disengaged from the guide member and also from lifting away from the guide member, thereby enhancing the efficiency of the wire harness-mounting operation.

The above object has been achieved by a harness excess-length absorbing apparatus of the first aspect of the present invention which is provided in that the apparatus comprises a protector for receiving a wire harness in a folded-back condition, a harness guide member which is provided in a folded-back portion of the wire harness, and can be moved in a longitudinal direction of the wire harness, and an urging member urging the harness guide member in a direction to draw the wire harness into the protector, wherein flanges are formed on and project substantially perpendicularly from opposite ends of a harness guide surface of the harness guide member, respectively, and a claw for holding the wire harness is formed at each of the flanges.

In the above construction, the wire harness is folded back around the harness guide surface of the harness guide member, and opposite side edges of the wire harness are positioned respectively along the flanges of the harness guide member, and the wire harness is prevented from being displaced from the opposite ends of the harness guide surface, and also the wire harness is prevented by the claws (disposed respectively at the opposite side edge portions thereof) from lifting radially outwardly from the harness guide surface.

The harness guide member and the urging member are incorporated in a combined condition into the protector, with the wire harness held by the claws (that is, with the wire harness engaged with the claws), and by doing so, the efficiency of the assembling operation is enhanced.

Within the protector, the urging member urges the harness guide member to move in the direction to draw the wire harness into the protector, thereby absorbing the slack (excess length) of the wire harness. The wire harness is drawn out of the protector in accordance with the opening or the closing of an opening/closing structure such as a door or a trunk.

The harness excess-length absorbing apparatus of a second aspect of the present invention, depending from the first aspect of the present invention, is provided in that the claws are offset from an apex of the harness guide surface toward one side of the harness guide surface.

In the above construction, the claws are provided respectively at corner portions of the flanges which are disposed not at the apex of the harness guide surface but at the one side of the harness guide surface, and therefore the distance from the apex of the harness guide surface to each claw is reduced into a small value, so that the harness guide member can be made compact in the longitudinal direction and widthwise direction of the wire harness.

The harness excess-length absorbing apparatus of a third aspect of the present invention, depending from the second aspect of the present invention, is provided in that a pair of the claws are provided at each of the opposite sides of the harness guide surface generally in a diametrical direction.

In the above construction, the wire harness is positively held by the two pairs of claws, so that the disengagement prevention ability is enhanced.

The harness excess-length absorbing apparatus of a fourth aspect of the present invention, depending from the first or the second aspect of the present invention, is provided in that a pair of the claws are provided at one side of the harness guide surface generally in the diametrical direction, while slanting ribs, formed respectively by notching the flanges in a slanting manner, are provided at the other side of the harness guide surface generally in the diametrical direction.

In the above construction, the pair of claws, provided at the one side of the harness guide surface, prevent the wire harness from being disengaged outwardly from the flanges of the harness guide member, and when the wire harness is disengaged from the harness guide surface at the other side thereof (where no claw is provided), the wire harness is smoothly returned (guided) to the harness guide surface by the pair of slanting ribs provided at the other side of the harness guide surface. Namely, when the wire harness is pulled, the wire harness is moved along the slanting edge of the slanting rib to be returned inwardly to the harness guide surface. Without such slanting ribs (in which case the claws are provided at the one side while high flange walls exist at the other side), the disengaged wire harness slides onto the flange, and the wire harness and its outer protective material are liable to be caught by this flange, so that the restorability is adversely affected.

The harness excess-length absorbing apparatus of a fifth aspect of the present invention, depending from claim 4, is provided in that each of the slanting ribs intersects the harness guide surface in a direction substantially tangential thereto, and is continuous with the harness guide surface.

In the above construction, the disengaged wire harness is guided to the harness guide surface along the slanting rib in the tangential direction, so that the restorability of the wire harness is enhanced.

In the first aspect of the present invention, the wire harness is held in a stable condition by the claws disposed respectively at the opposite side edge portions of the wire harness, and therefore the wire harness is prevented from being disengaged from the harness guide member, and the wire harness is prevented from sticking, wear due to sliding contact, damage, etc., which would be caused by the disengagement of the wire harness, and therefore the power supply reliability is enhanced. And besides, the harness guide member and the urging member can be incorporated in a combined condition into the protector, with the wire harness held by the claws, and therefore the efficiency of the assembling operation is enhanced.

In the second aspect of the present invention, the distance from the apex of the harness guide surface to each claw is reduced into a small value, so that the harness guide member can be made compact in the longitudinal direction of the wire harness. Therefore, the apparatus can be positively mounted in a narrow space in a vehicle or the like.

In the third aspect of the present invention, the wire harness is positively held by the two pairs of claws, so that the disengagement prevention ability is enhanced, and the wire harness is more positively prevented from wear due to sliding contact and damage which would be caused by the disengagement of the wire harness.

In the fourth aspect of the present invention, the wire harness is held by the pair of claws (provided at the one side of the harness guide surface) against disengagement therefrom, and even if the wire harness should move over the slanting rib (provided at the other side of the harness guide surface), the wire harness is soon returned to the harness guide surface along the slanting edge of the slanting rib. Eventually, the disengagement of the wire harness is prevented, and the advantages of the first aspect of the present invention (that the wire harness is prevented from sliding-contact wear, damage, etc., and that the power supply reliability is enhanced) are positively achieved, and besides the efficiency of the assembling operation is enhanced.

In the fifth aspect of the present invention, the disengaged wire harness is guided to the harness guide surface along the slanting rib in the tangential direction, so that the advantages of the fourth aspect of the present invention are more positively achieved.

DETAILED DESCRIPTION OF THE PREFERRED EMBODIMENTS

Figure 1:
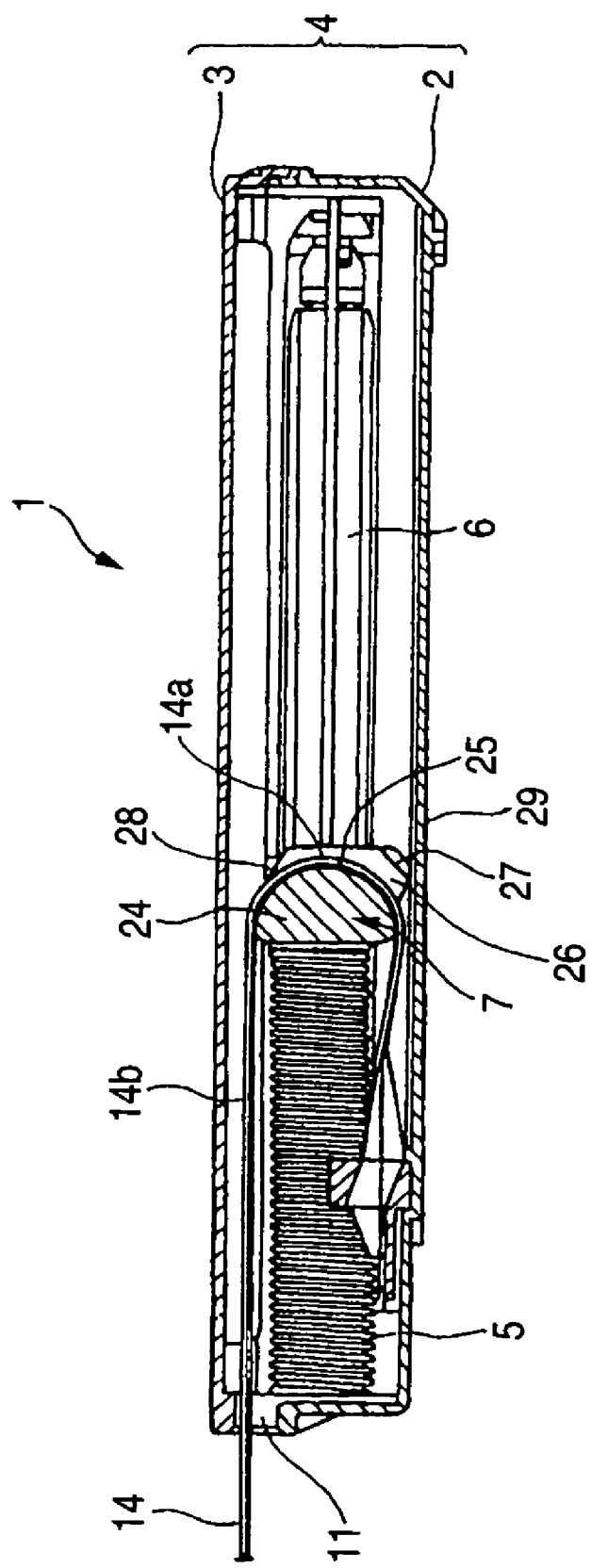
FIG. 1 is a longitudinal cross-sectional view of one preferred embodiment of a harness excess-length absorbing apparatus of the present invention in its assembled condition.
Figure 2:
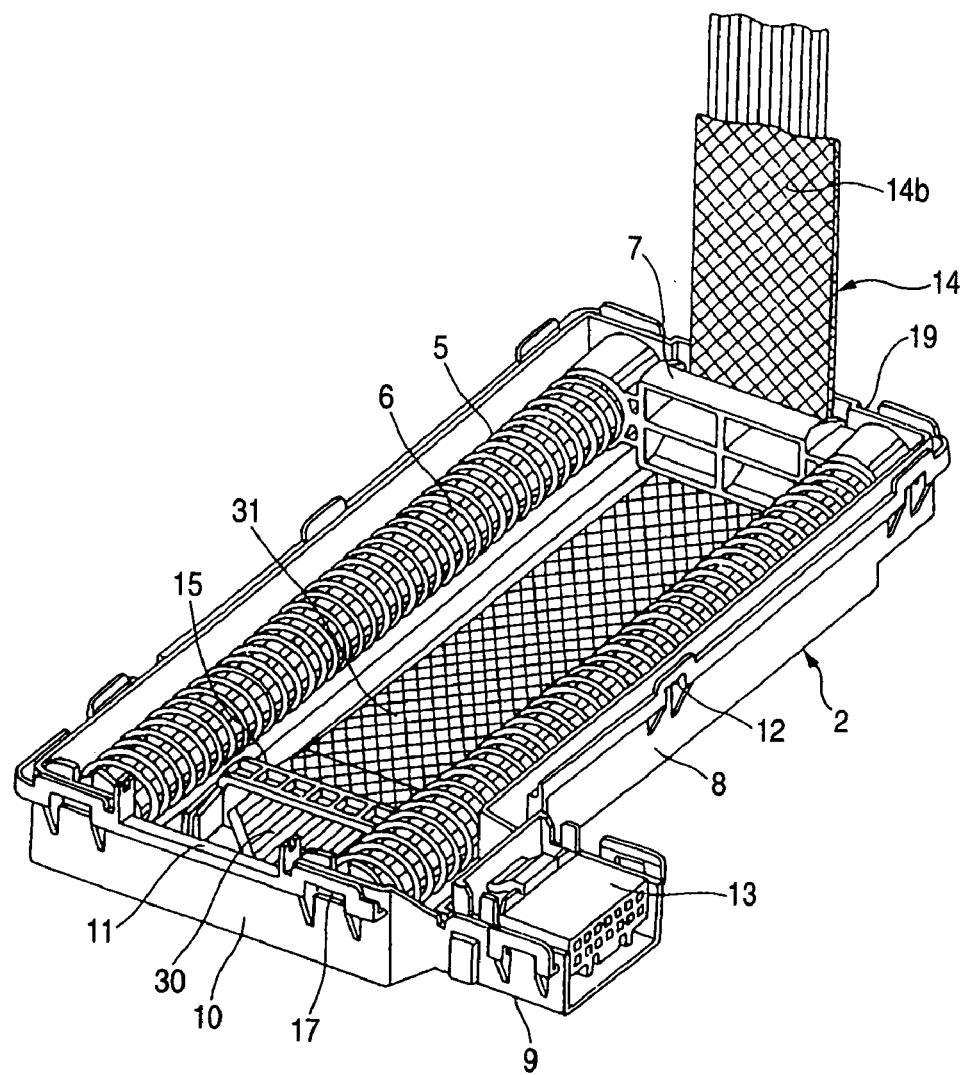
FIG. 2 is a perspective view showing the internal structure of the harness excess-length absorbing apparatus.

FIG. 1 is a longitudinal cross-sectional view of one preferred embodiment of a harness excess-length absorbing apparatus of the present invention in its completely-assembled condition (in a wire harness drawn-out condition), and FIG. 2 is a perspective view showing the internal structure of this harness excess-length absorbing apparatus.

The harness excess-length absorbing apparatus 1 comprises a synthetic resin-made protector (casing) 4, a pair of left and right metallic compression coil springs (urging members or resilient members) 5 received within the protector 4, synthetic resin-made guide pins 6 passing respectively through the interiors of the coil springs 5, and a synthetic resin-made harness guide member 7 which is urged in its expanding direction by distal ends of the pair of coil springs 5, and can slide along the guide pins 6 within the protector 6.

The protector 4 comprises a box body 2, and a cover 3 mounted on this box body 2 to close the same. The box body 2 includes a connector holding wall 9 formed at a rear end portion of one side wall 8 (FIG. 2), a recess 11 (serving as a harness outlet port) formed in a central portion of an upper edge of a rear wall 10, and frame-like retaining portions (retaining means) 12 (for retaining the cover) formed at the front, rear, right and left side walls. The front, rear, left and right directions described here are given merely for convenience' purposes, and these directions are not always in agreement with those in actual use of the protector 4.

A connector 13 is retained on the connector holding wall 9 by retaining means, and terminals within the connector 13 are connected to conducting circuits of a flat wire harness 14. The flat wire harness 14 is installed at a widthwise central portion of the box body 2, and is folded at a right angle at the rear end portion of the box body 2, and is connected to the connector 13. The connector 13 is connected via a connector, for example, to a wire harness connected to a power source on a vehicle body.

The pair of coil springs 5 are disposed respectively at opposite (right and left) side portions of the interior of the box body 2. Each coil spring 5 in its most expanded condition has a slight urging force (resilient force) acting in its expanding direction. Each guide pin 6 is passed through the interior of the corresponding coil spring 5, and a flange portion 16 (FIG. 3), formed at a proximal end of the guide pin 6, is held against the inner surface of the rear wall 10 of the box body 2, and is retained by retaining means (a retaining hole 17 and an engagement projection), while projections 18 (FIG. 3), formed at a distal end of the guide pin 6, are engaged respectively in holes in a front wall 19 of the box body 2; and are fixed thereto.

Figure 3:
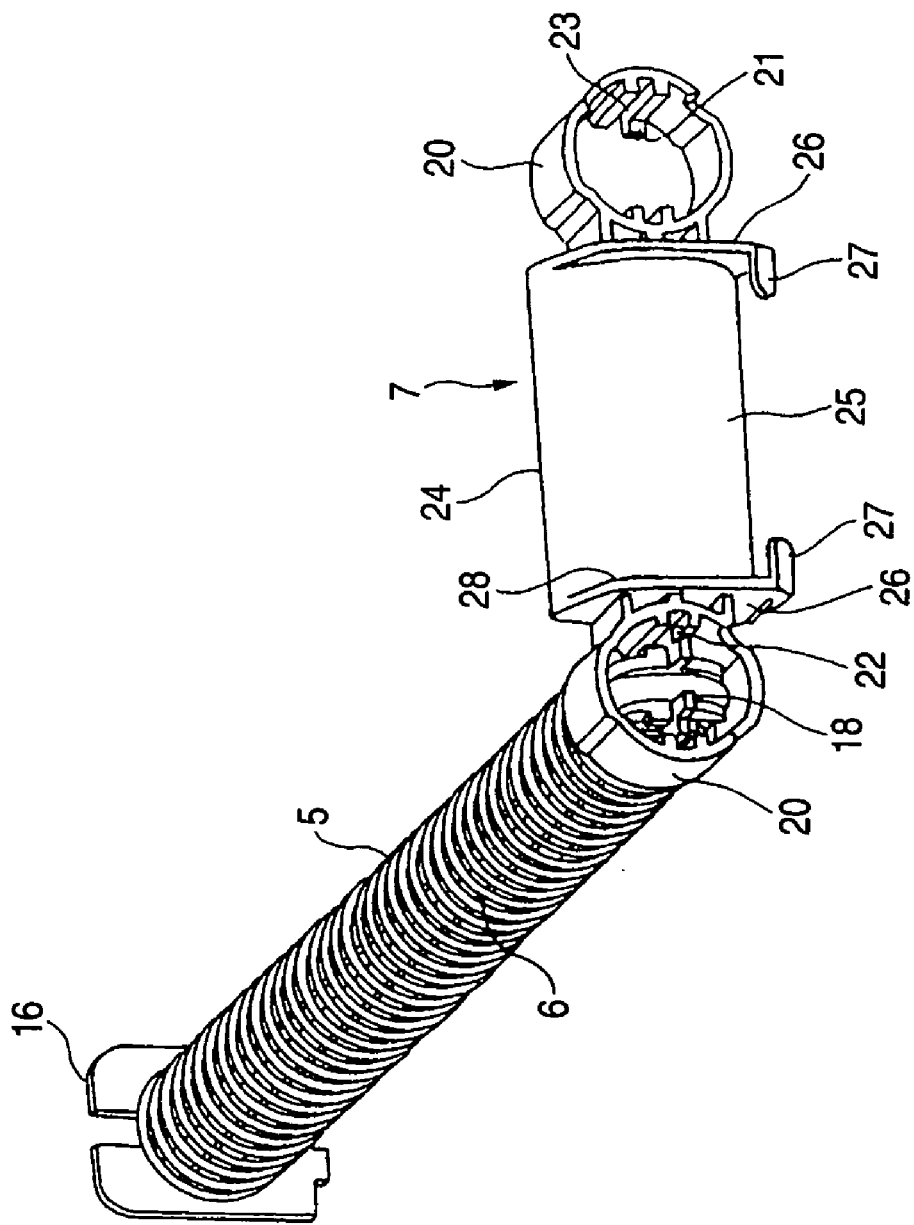
FIG. 3 is a perspective view showing an assembly (assembling structure) comprising a coil spring, a guide pin and a harness guide member which are provided within the apparatus.

As shown also in FIG. 3, the distal ends of the guide pins 6 are stopped respectively within annular portions 20 formed respectively at opposite ends of the harness guide member 7 (Only one guide pin 6 is shown in FIG. 3). Namely, claws (not shown), formed at the distal end of the guide pin, abut respectively against stopper projections 21 formed on an inner surface of the annular portion 20 (The claws are disposed at the front side while the stopper projections 21 are disposed at the rear side), and in this condition the distal end (front end) of the coil spring 5 resiliently abuts against a rear end of the annular portion 20. The claws are formed integrally with slide ribs 22, and the slide ribs 22 are slidably engaged respectively in guide grooves 23 within the annular portion 20, and the stopper projections 21 are formed respectively at rear ends of the guide grooves 23.

The harness guide member 7, while compressing the coil springs 5, can be slidingly moved along the guide pins 6 in a harness draw-out direction, and also can be slidingly moved along the guide pins 6 in a harness draw-in direction by the urging force of the coil springs 5 acting in the expanding direction. As shown in FIG. 1, the harness guide member 7 is disposed in contact with an inner surface of a folded-back portion 14a of the flat wire harness 14.

As shown in FIG. 3, the harness guide member 7 includes the pair of left and right annular portions 20 for sliding movement purposes, and a central guide portion body 24 interconnecting the pair of annular portions 20. The guide portion body 24 has a half moon-shaped transverse cross-section, and has a forwardly-directed arcuately-curved surface (harness guide surface) 25. As shown in FIG. 1, the flat wire harness 14 is folded back around the curved surface 25 into a smooth arcuate shape.

Figure 4:
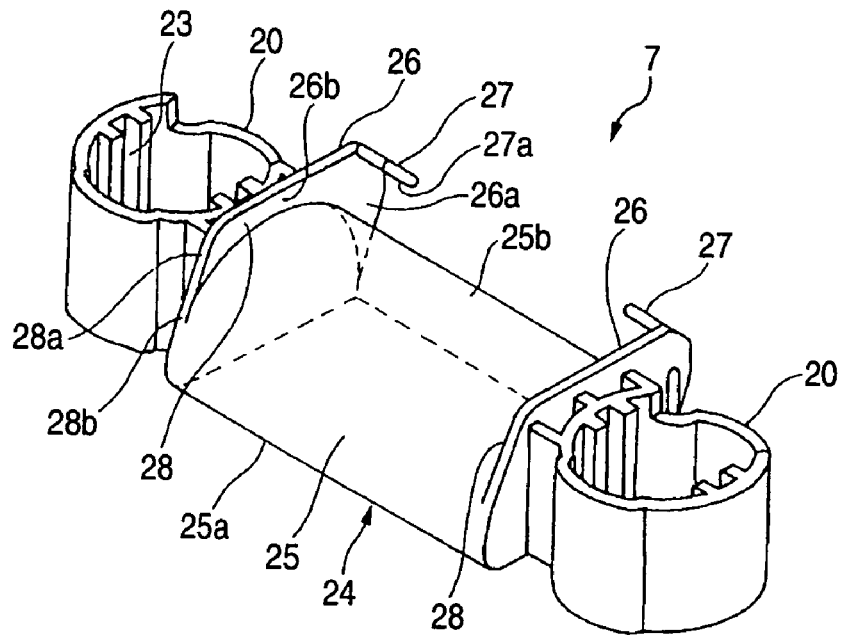
FIG. 4 is a perspective view showing one form of harness guide member.

As shown also in FIG. 4, flanges (flange walls) 26 are integrally formed at opposite (left and right) ends of the guide portion body 24, respectively. Each flange 26 has a projecting portion 26a of a generally rectangular shape or a generally triangular shape which is provided at one side of the guide portion body 24 generally in a diametrical direction, and considerably projects generally radially from the guide portion body 24. A harness-holding claw 27 is formed at a corner portion of the projecting portion 26a, and is directed inwardly.

The pair of left and right flanges 26 are provided, and the pair of claws 27 are formed on the pair of flanges 26, respectively. A gap between an inner surface 27a of each claw 27 and the curved surface 25 is sufficiently larger than the thickness of the flat wire harness 14. Each claw 27 is formed into a flat plate piece-shape, and is inclined at an angle of about 45 degrees relative to the longitudinal direction of the wire harness. The flat wire harness 14 is held by the pair of claws 27 against disengagement from the guide portion body 24, and is always disposed around the curved surface 25.

The flange 26 is notched at the other side of the guide portion body 24 generally in the diametrical direction, and extends in a tapering (slanting) manner in a direction generally tangential to the curved surface 25. This slanting rib (slanting projecting portion) 28 intersects the curved surface 25 intermediate a proximal end 25a and an apex 25b of this curved surface 25 in the tangential direction, and is continuous therewith. The slanting ribs 28 prevent the flat wire harness 14 from projecting (moving) outwardly from the guide portion body in the widthwise direction, and even if the flat wire harness 14 should project in the widthwise direction (that is, should move over the slanting rib 28), the flat wire harness 14 is soon moved back inwardly by the slant (slanting edge) of the slanting rib 28.

That portion (designated by reference numeral 26b) of the flange 26, corresponding to the apex 25 of the curved surface 25, projects to a small height generally equal to the thickness of the flat wire harness 14, and therefore the harness guide member 7 is formed into a compact design (low-height design) in the sliding direction. The claws 27 are disposed at the one side of the guide portion body 24 generally in the diametrical direction, while the slanting ribs 28 are disposed at the other side of the guide portion body 24 generally in the diametrical direction. The slanting rib 24 forms part of the flange 26.

Figure 5:
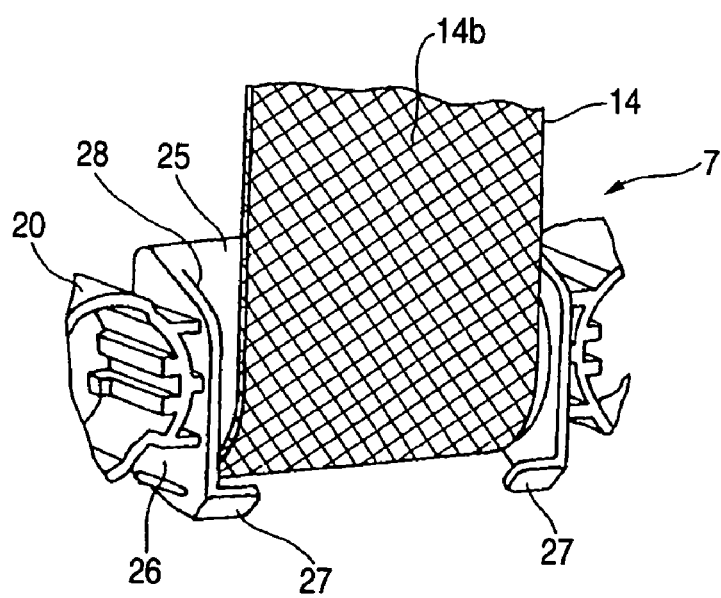
FIG. 5 is a perspective view showing a condition in which a wire harness is installed on the harness guide member.

As shown in FIG. 5, the flat wire harness 14 is disposed inwardly of the inner surfaces of the pair of claws 27, and is held against disengagement from the guide portion body. In this condition (shown in FIG. 2), that portion 14b of the flat wire harness 14, extending upwardly from the harness guide member, is folded back, and then is led to the exterior through the recess 11 formed in the rear wall 10 of the box body 2 (FIG. 2), and in this condition the cover 3 of FIG. 1 is attached to the box body 2. A recess in the cover 3 and the recess 11 in the box body 2 jointly form the harness outlet port (also designated by reference numeral 11). A connector (not shown), connected to the thus led-out flat wire harness 14, is connected via a connector to a wire harness extending from an electrical equipment or an accessory mounted, for example, on an opening/closing structure such as a door and a trunk (luggage door).

As shown in FIG. 1, the flat wire harness 14 is installed to extend from the connector (13) side horizontally along an inner surface of a wall (main wall) 29 of the box body 2, and is folded back and curved around the curved surface 25 of the guide portion body 24 of the harness guide member 7. The guide portion body 24 is spaced from the wall 29 by a distance larger than the thickness of the flat wire harness 14, and the claws 27 are disposed in close proximity to the inner surface of the wall 29. The folded-back portion 14b of the flat wire harness 14 extends around the curved surface 25 to be disposed outwardly of the proximal ends (that is, intersecting portions 28b (FIG. 4)) of the slanting ribs 28 of the flanges 26 in the radial direction of the curved surface 25, and further the flat wire harness extends horizontally toward the harness outlet port 11, and is led to the exterior through the harness outlet portion 11.

In this embodiment, the flat wire harness 14 comprises a flat cable 30 (FIG. 2) covered with a soft protective tube 31 of a mesh-like construction made of a synthetic resin, so that the flat wire harness 14 is flexible. The flat cable 30 comprises a plurality of parallel circuit conductors provided in an insulative sheet. The provision of the protective tube can be omitted, in which case the flat cable 30 is covered at its outer surfaces with protective sheets to provide a flat wire harness.

In a mode of use of the above harness excess-excess length absorbing apparatus 1, the protector 4, shown in FIG. 1, is, for example, inverted, and is horizontally fixed to the vehicle body, and the flat wire harness 14 is bent upwardly intermediate its opposite ends by a guide member (not shown) provided outside the protector, and is fixedly connected to a connector (not shown) of the trunk. The flat wire harness 14 is led out horizontally through the harness outlet port 11 in the protector 4.

The mode of use is not limited to the above example, and there can be used an arrangement in which the protector 4 is disposed horizontally (that is, in a recumbent manner), and the wire harness 14 is installed horizontally without the use of an intermediate guide member (not shown), or there can be used an arrangement in which the protector 4 is disposed vertically, and the wire harness can be linearly drawn out in accordance with an opening operation of a door or the like.

In the drawn-out condition (FIG. 1) of the flat wire harness 14, when the opening/closing structure such as a door is closed, the harness guide member 7 is returned to its original position by the urging force of the coil springs 5 exerted in the expanding direction, so that the wire harness 14, while following the harness guide member 7, is drawn into the protector 4, thereby absorbing the slack (excess length) of the wire harness.

Figure 7:
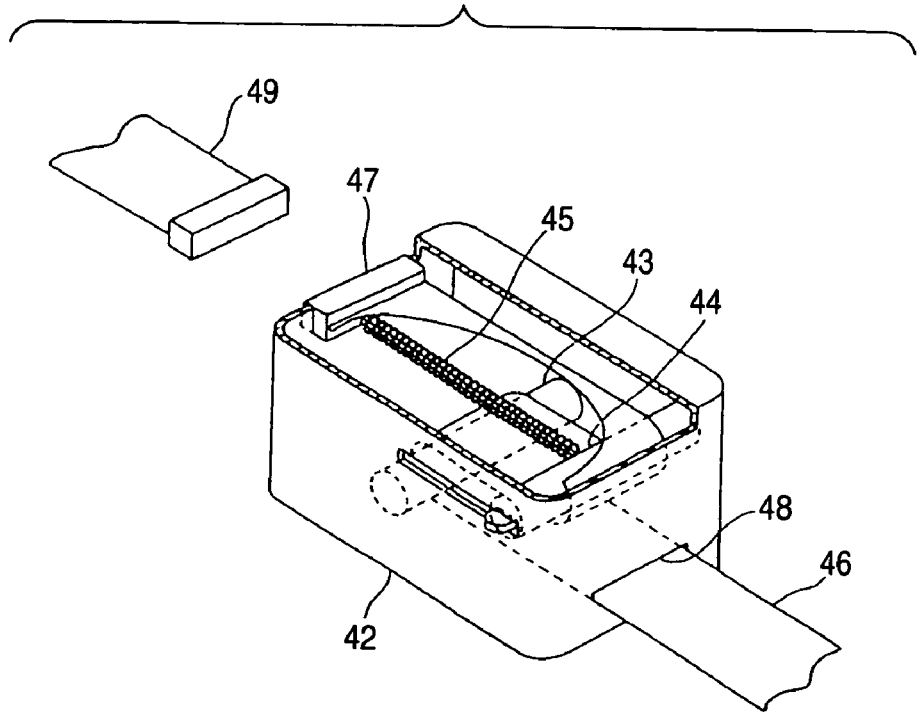
FIG. 7 is an exploded, perspective view showing one conventional harness excess-length absorbing apparatus.

In this embodiment, although the pair of left and right coil springs 5 are used, there can be used a construction in which one coil spring 5 is provided at a widthwise central portion of the box body so as to directly drive the guide portion body 24 of the harness guide member 7 as in the conventional construction of FIG. 7.

In the above embodiment, although the pair of claws 27 are provided at the one side of the harness guide member 7 in opposed relation to each other, while the slanting ribs 28 are provided at the other side thereof in opposed relation to each other, there can be used a modified harness guide member 7' (shown in FIG. 6) in which the provision of the slanting ribs 28 is omitted, and flanges 26' of a generally rectangular shape are formed into a larger size, and a pair of claws 27' are formed respectively at opposite ends of each flange 26' (In this case, two pairs of claws 27' are provided). In this case, also, the flat wire harness 14 can be held against disengagement.

In this case, however, when the flat wire harness 14 is to be inserted inside the two pairs of claws 27', the flat wire harness 14, while compressed in the direction of the width thereof with the hands, must be pushed inside the claws, and therefore more time and labor are required as compared with the above embodiment. And besides, if the flat wire harness should be disengaged from the claw 27', there is a possibility that the drawing-in and drawing-out operations are effected in this disengaged condition, and therefore in this respect, also, the structure of the above embodiment of FIG. 4 is superior.

Figure 6:
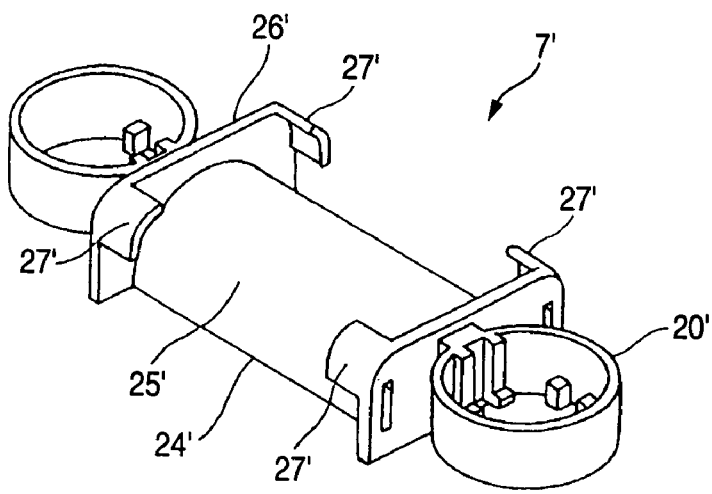
FIG. 6 is a perspective view showing another form of harness guide member.

Each of the claws 27' in the embodiment of FIG. 6 is formed not into a flat plate-shape but into a curved shape (arcuate shape). In the preceding embodiment (FIG. 4), each claw 27 of a flat plate-shape can be formed into a curved shape or other shape. In FIG. 6, reference numeral 20' denotes an annular portion, reference numeral 24' a guide portion body, and reference numeral 25' a curved surface, and these portions have the same functions as those of the above embodiment of FIG. 4.

In the above embodiment, although there is used the protector 4 comprising the box body 2 and the cover 3, there can be used the type of protector 4 having a box body 2 and a cover 3 which are formed integrally with each other, and in this case the internal constituent parts, including the coil springs 5 and the harness guide member 7, are introduced into the protector, for example, through a rear opening (not shown) formed in the protector, and this rear opening is closed by a narrow plate cover (not shown).

The position and direction of the connector 13, provided at the protector 4, can be suitably changed in accordance with the mode of use. And besides, instead of the flat cable 30, a plurality of insulating sheathed wires (not shown), arranged parallel in a row, can be used as the flat wire harness 14. Furthermore, although it is preferred that the curved surface 25 of the harness guide member 7 have a semi-circular shape, it can have an arcuate shape, a round shape or others.

What is claimed is:

1. A harness excess-length absorbing apparatus comprising:
    a protector for receiving a wire harness in a folded-back condition;
    a harness guide member provided in said protector, said wire harness having a folded-back portion that is passed partially around said guide member, said guide member being moveable with respect to said protector in a longitudinal direction of said wire harness, said harness guide member including:
    a guide portion having a harness guide surface;
    flanges erected substantially perpendicularly from opposite ends of said harness guide surface, respectively;
    claws, for holding said wire harness, formed at each of said flanges, respectively; and
    an urging member urging said harness guide member in a direction to draw said wire harness into said protector.

2. A harness excess-length absorbing apparatus according to claim 1, wherein said claws are offset from an apex of said harness guide surface toward one side of said harness guide surface.

3. A harness excess-length absorbing apparatus according to claim 2, wherein a pair of said claws are provided at each of the opposite sides of said harness guide surface generally in a diametrical direction.

4. A harness excess-length absorbing apparatus according claim 1, wherein a pair of said claws are provided at one side of said harness guide surface generally in the diametrical direction, and slanting ribs, formed respectively by notching said flanges in a slanting manner, are provided at the other side of said harness guide surface generally in the diametrical direction.

5. A harness excess-length absorbing apparatus according to claim 2, wherein a pair of said claws are provided at one side of said harness guide surface generally in the diametrical direction, and slanting ribs, formed respectively by notching said flanges in a slanting manner, are provided at the other side of said harness guide surface generally in the diametrical direction.

6. A harness excess-length absorbing apparatus according to claim 4, wherein each of said slanting ribs intersects said harness guide surface in a direction substantially tangential thereto, and is continuous with said harness guide surface.

7. A harness excess-length absorbing apparatus according to claim 5, wherein each of said slanting ribs intersects said harness guide surface in a direction substantially tangential thereto, and is continuous with said harness guide surface.

* * * * *